(12) United States Patent
Tamura et al.

(10) Patent No.: US 6,701,471 B2
(45) Date of Patent: Mar. 2, 2004

(54) EXTERNAL STORAGE DEVICE AND MEMORY ACCESS CONTROL METHOD THEREOF

(75) Inventors: Takayuki Tamura, Yokohama (JP); Shigemasa Shiota, Tachikawa (JP); Kunihiro Katayama, Chigasaki (JP); Masashi Naito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/750,707

(22) Filed: Jan. 2, 2001

(65) Prior Publication Data

US 2001/0001327 A1 May 17, 2001

Related U.S. Application Data

(63) Continuation of application No. 09/544,609, filed on Apr. 6, 2000, now Pat. No. 6,199,187, which is a division of application No. 09/046,705, filed on Mar. 24, 1998, now abandoned, which is a continuation of application No. 08/679,960, filed on Jul. 15, 1996, now Pat. No. 5,732,208.

(51) Int. Cl.[7] .............................................. G11C 29/00
(52) U.S. Cl. ............................. 714/718; 365/200; 714/6
(58) Field of Search ........................ 714/718, 28, 719, 714/763, 7, 6, 8; 365/200, 201

(56) References Cited

U.S. PATENT DOCUMENTS

| | | | |
|---|---|---|---|
| 5,123,016 A | 6/1992 | Mü et al. | |
| 5,640,506 A | 6/1997 | Duffy | |
| 5,732,208 A | * 3/1998 | Tamura et al. | |
| 5,844,910 A | 12/1998 | Niijima et al. | |
| 6,031,758 A | 2/2000 | Katayama et al. | |
| 6,119,245 A | 9/2000 | Hiratsuka | |
| 6,236,601 B1 | 5/2001 | Katayama et al. | |

FOREIGN PATENT DOCUMENTS

| | | |
|---|---|---|
| JP | 62-239252 | 10/1987 |
| JP | 63-219045 | 9/1988 |
| JP | 3-131951 | 6/1991 |
| JP | 4-311236 | 4/1992 |
| JP | 4-308971 | 10/1992 |
| JP | 5-67005 | 3/1993 |
| JP | 5-274219 | 10/1993 |
| JP | 6-20483 | 1/1994 |
| JP | 6-105443 | 4/1994 |
| JP | 06-124596 | 5/1994 |
| JP | 7-56816 | 3/1995 |

* cited by examiner

Primary Examiner—Phung M. Chung
(74) Attorney, Agent, or Firm—Antonelli, Terry, Stout & Kraus, LLP

(57) ABSTRACT

High-speed memory access and transparent error detection and correction using a single error correcting means are obtained and processed by an external storage device of a host computer when sector data having an arbitrary byte width are accessed continuously according to a size of a sector unit. Consequently, the host computer always reads sector data, and at the same time, error detection and the error correction for a next sector data are simultaneously performed, thereby greatly reducing the time required for error detection and error correction, and high speed memory access can be obtained.

33 Claims, 19 Drawing Sheets

FIG. 4

(SELECTING CIRCUIT (116))

| DATA SELECTION SETTING REGISTER 115 | INTERNAL DATA BUS 114 |
|---|---|
| 0 | FIRST MEMORY BUS 111 |
| 1 | SECOND MEMORY BUS 112 |

FIG. 5

(SELECTING CIRCUIT (117))

| DATA SELECTION SETTING REGISTER 115 | EEC BUS 113 |
|---|---|
| 0 | FIRST MEMORY BUS 112 |
| 1 | SECOND MEMORY BUS 111 |

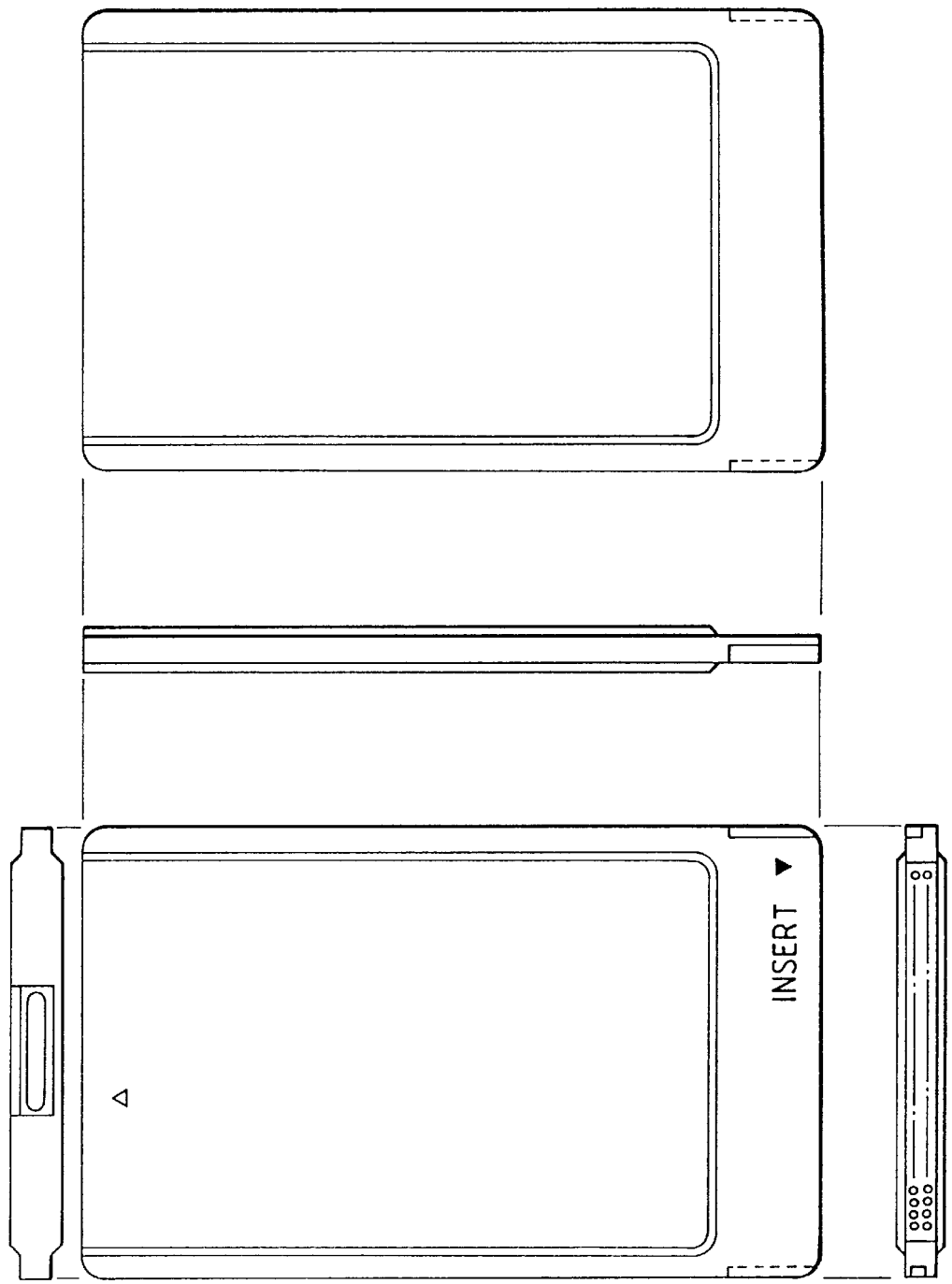

EXTERNAL STORAGE DEVICE AND MEMORY ACCESS CONTROL METHOD THEREOF

CROSS-REFERENCE TO RELATED APPLICATIONS

This is a continuation of U.S. application Ser. No. 09/544,609 filed Apr. 6, 2000, now U.S. Pat. No. 6,199,187 A, which is a division of U.S. application Ser. No. 09/046,705 filed Mar. 24, 1998, presently pending, which is a continuation of U.S. application Ser. No. 08/679,960 filed Jul. 15, 1995, now U.S. Pat. No. 5,732,208 A.

BACKGROUND OF THE INVENTION

1. Field of the Invention

The present invention relates to an external storage device of a computer using, for example, a static storage device, and more particularly relates to an external storage device for processing error detection and error correction of sector data at a high speed when sector data having an arbitrary byte width are accessed continuously according to a size of a sector unit.

2. Description of Related Art

With regard to background art, in order to simultaneously realize an improvement in reliability and high speed access in memory control, as disclosed in Japanese Patent Laid-Open No. Hei 6-105443 (1994), there is a system where data of an x-byte width outputted from a memory are divided into an odd number part (x/2 byte width) and an even number part (x/2 byte width), and regarding each of the odd number part and the even number part, error detection and error correction are performed using error correcting codes, and data of an x/2 byte width as outputted from the odd number part and the even number part are continuously outputted to a system bus of an x/2 byte width by an interleave control method.

In order to perform the error detection and the error correction for sector data having an m-byte (e.g., 512 byte) width, the sector data of an m-byte width must be divided into an n-byte (e.g., one byte) unit for m/n times (m is a multiple of n) and then inputted to error correcting means.

However, since error detection and error correction in the background art as described above are performed for data having a same byte width as that of the system bus, a differing byte arrangement cannot be applied as it is to error detection and error correction for sector data having an m-byte width larger than the byte width of the system bus. Moreover, as a further disadvantage in the background art as above described, both the odd number part and the even number part require individual error correcting means.

The teachings of each of any above- or below-listed art are herein incorporated by reference.

SUMMARY OF THE INVENTION

An object of the present invention is to provide an external storage device where a time required for error detection and error correction is reduced when error detection and error correction are performed for sector data having an m-byte width larger than the byte width of the system bus, and to realize a memory access at a high speed.

Another object of the present invention is to provide an external storage device where a time required for error detection and error correction is reduced using a single error correcting means, and to realize a memory access at a high speed.

In order to attain the foregoing objects, the present invention provides an external storage device comprising: a system interface section for conducting an interface with a host computer; error correcting means for performing error detection and error correction for sector data constituted by data having a byte number larger than that of a bus width of a system bus connecting the system interface section and the host computer; a first memory and a second memory as static storage devices each having a memory bus with a same bus width as that of the system bus for storing sector data; and control means for controlling a reading and writing operation of sector data from the host computer to the first memory and the second memory, wherein in response to a write command from the host computer, the control means stores a plurality of sector data attendant on the write command in the size of a sector unit alternately in the first memory and the second memory, and in response to read command from the host computer, the control means reads out the first sector data among a plurality of sector data required by the read command from the first memory and supplies the read-out sector data to the error correcting means, and then the control means reads out the sector data of the first memory and the second memory simultaneously, so that while the N-th (where N is a natural number) sector data from one of the first memory and the second memory are transferred to the system interface section, the (N+1)th sector data from the other are transferred to the error correcting means.

In this preferred external storage device, data changing means selectively connects the memory bus of the first memory to one of the system interface section and the error correcting means, and also selectively connects the memory bus of the second memory to the other, and during the read access from the host computer, the control means alternately controls the data changing means so as to selectively and alternately read out the sector data of the first memory and the second memory.

In a write access of sector data from the host computer to the first and second memories, a write buffer for temporarily storing the sector data may be provided to effect storage of the sector data in the first and second memories through the write buffer.

In another embodiment, in place of the first memory and the second memory, a memory having a memory bus width of twice that of the system bus for storing sector data may be used. In this case, in response to write command from the host computer, the control means stores odd-numbered sector data (among a plurality of sector data) attendant on the write command using, for example, an upper side of the memory bus and memory, and also stores even-numbered sector data using, for example, a lower side of the memory bus and memory. In response to a read command from the host computer, the control means reads out the first sector data among a plurality of sector data required by the read command from the upper side of the memory and supplies the readout sector data to the error correcting means, and then the control means reads out the sector data at the upper side and the lower side of a memory address simultaneously, so that while the N-th (where N is a natural number) sector data from one of the upper side and the lower side of the memory address are transferred to the system interface section, the (N+1)th sector data from the other are transferred to the error correcting means.

Also in a memory access control method of an external storage device according to the present invention, the external storage device having a static storage device storing sector data and comprising a first memory storing odd-numbered sector data of sectors of a plurality of continuous sectors of an access object and a second memory storing even-numbered sector data of sectors as the static storage device and error correcting means performing error detection and error correction for the sector data are used. When write access is performed from a host computer to the plurality of continuous sectors, odd-numbered sector data together with error correcting codes are stored in the first memory and also even-numbered sector data together with error correcting codes are stored in the second memory alternately in a size of a sector unit. When a read access is performed from the host computer to the plurality of continuous sectors, the first sector data are read out from the memory and error detection and error correction are performed by the error correcting means and while the first sector data having the error detection and error correction finished are transferred from the first memory to the host computer, the second data are simultaneously read out from the second memory and transferred to the error correcting means. Subsequently, while the second data having the error detection and error correction finished are transferred from the second memory to the host computer, third sector data are simultaneously read out from the first memory and transferred to the error correcting means. In a similar manner, while the N-th sector data having the error detection and error correction finished are transferred to the host computer, the (N+1)th sector data are simultaneously read out and transferred to the error correcting means.

According to the present invention, control means (e.g., a microprocessor) can store a plurality of sector data of a write object in a memory so that the N-th sector data and the (N+1)th sector data can be read out simultaneously. Thereby, at any time, the N-th sector data can be outputted to a system bus by data changing means, and (N+1)th sector data can be simultaneously outputted to error correcting means. Consequently, since a time required for the error detection and error correction for the (N+1)th data can be performed simultaneously during the time the Nth data are outputted to the system bus, the time (as experienced by the external storage arrangement) required for the error detection and error correction for the sector data can be reduced apparently (i.e., made transparent to a host computer).

Also since the error detection and error correction are always executed only for singular sector data which is subsequent to the sector data currently being transferred to the host computer, a single error correcting means may be used well.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments at the time the patent application was filed in order to teach one skilled in the art to make and use the invention, and to otherwise satisfy the best mode disclosure requirements under U.S. patent law, it should be clearly understood that the same is by way of illustration and example only and is not to be taken by way of limitation, the spirit and scope of the present invention being limited only by the terms of the appended claims.

BRIEF DESCRIPTION OF THE DRAWING(S)

The following represents brief descriptions of the drawings, wherein:

FIG. 4 is a diagram showing a truth table of a read data selecting circuit 116.

FIG. 5 is a diagram showing a truth table of an error correcting means input data selecting circuit 117.

FIG. 20 are views of a memory card containing an external storage device of the invention.

DETAILED DESCRIPTION OF THE PREFERRED EMBODIMENTS OF THE INVENTION

Figure 1:
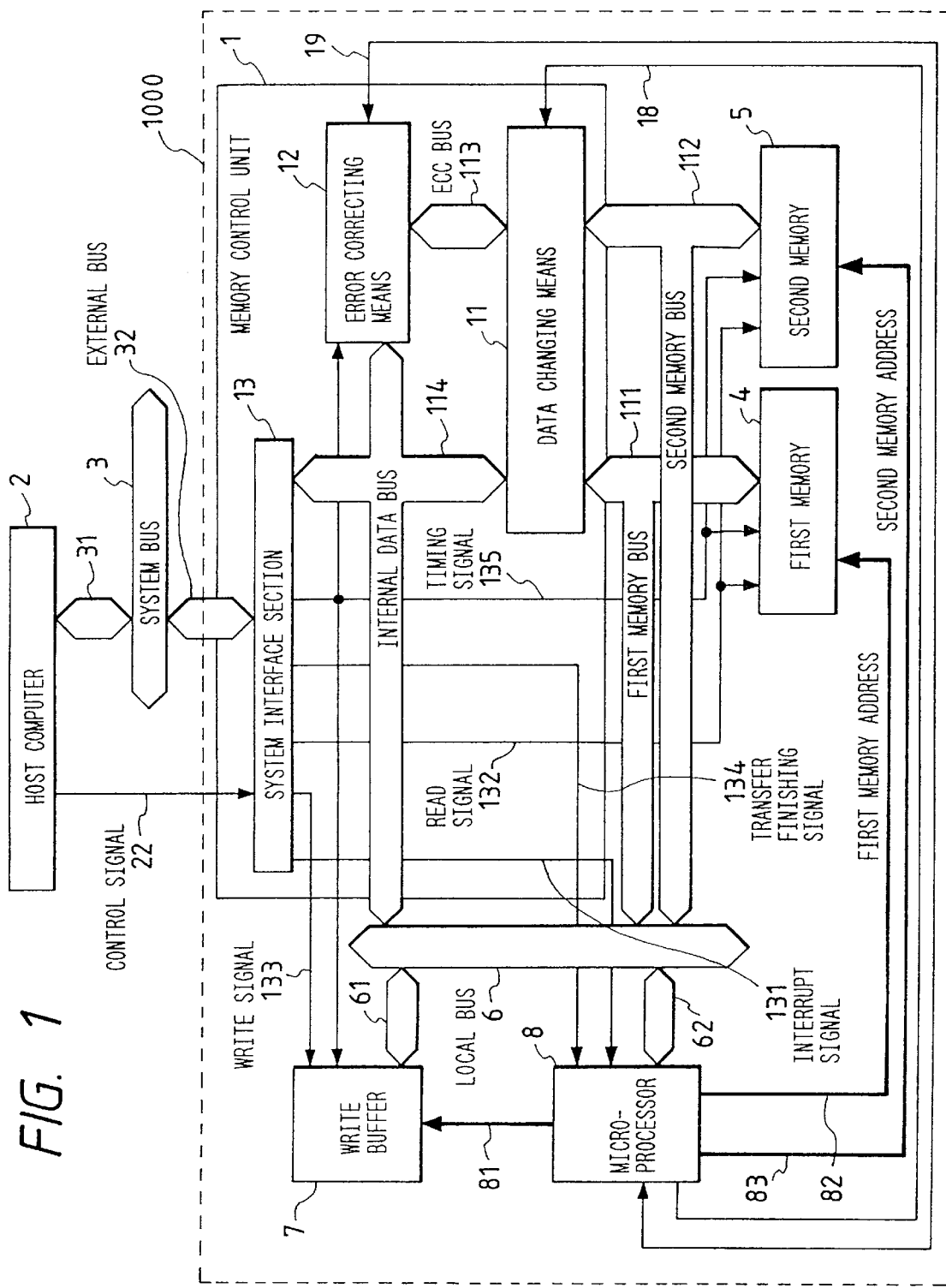
FIG. 1 is a block diagram showing a system configuration of an external storage device of the invention.

Before beginning a detailed description of the subject invention, mention of the following is in order:

When appropriate, like reference numerals and characters are used to designate identical, corresponding or similar components in differing figure drawings.

Embodiments of the present invention will be described using the accompanying drawings as follows. More particularly, FIG. 1 is a block diagram showing a system configuration of a first embodiment of an external storage device 1000 according to the present invention. A memory control unit 1 writes or reads sector data to a first memory 4 and a second memory 5 according to a command from a host computer 2, such memory control unit receiving the command of the host computer 2 by a control signal 22 and an external bus 32. The host computer 2 is connected to a system bus 3 by a host computer bus 31, and performs read and write operations of the sector data to the memory control unit 1 using the control signal 22 and the system bus 3.

The first memory 4 and the second memory 5 are storage means storing the sector data respectively, and a flash memory is used in a preferable embodiment although use of the present invention is not limited thereto. The flash memory is a known non-volatile semiconductor memory where electric erase and rewrite of data are possible in the size of a sector unit of a predetermined byte number (e.g., 512 bytes). However, the present invention can be applied also to other memory device and arrangement, and especially static storage devices.

A local bus 6 is a bus connecting the memory control unit 1, a write buffer 7 and a microprocessor 8. The write buffer 7 is a storage means for temporarily storing the sector data written by the host computer 2, and is connected to the local bus 6 by a write buffer bus 61. The microprocessor 8 is connected to the local bus 6 by a microprocessor bus 62, analyzes the command set to the memory control unit 1 by the host computer 2 and sets the operation to be performed by the memory control unit 1. In this preferred embodiment, when a bus width of the system bus 3 is, for example, M bytes, a bus width of the local bus 6 is also M bytes to match that of the system bus 3, and also, a bus width of each of a first memory bus 111 and a second bus 112 is M bytes to match that of the system bus 3.

Data changing means 11 selectively directs the sector data from the first memory bus 111 and the second memory bus 112 onto an ECC bus 113 and an internal data bus 114. Error correcting means 12 generates error correcting codes for sector data for output to the internal data bus 114, also performs error detection and error correction of sector data input from the ECC bus 113, and informs the microprocessor 8 of the results of the error detection and error correction using a signal line 19. A system interface section 13 receives any command for memory access from the host computer 2 along the control signal 22 and the external bus 32. In response to such memory access command, the system interface section 13 outputs an interrupt signal 131 to the microprocessor 8. Also the system interface section 13 generates an appropriate read signal 132, a write signal 133, a transfer finishing signal 134 and a timing signal 135 to control read/write of sector data by the control signal 22.

When the host computer 2 instructs writing of sector data, the write signal 133 is outputted and the sector data from the host computer 2 are stored from the internal data bus 114 into the write buffer 7 in accordance with a timing of the timing signal 135. Also when the host computer 2 instructs reading of sector data, the read signal 132 is outputted and the sector data of the first memory bus 111 or the second memory bus 112 are read out in accordance with a timing of the timing signal 135 and directed to the internal data bus 114 by the data changing means 11 and outputted from the system interface section 13 to the computer 2. Further the sector data are outputted to the host computer 2, and at the same time the sector data (e.g., next sequential sector data) of the first memory bus 111 or the second memory bus 112 are directed into the ECC bus 113 by the data changing means 11 (under control of a signal from the microprocessor 8 along a signal line 18) and error detection and error correction are performed in the error correcting means 12.

In a preferred embodiment, components along a lower side of the system interface section 13, or contained within the outline designated by 1000 (in FIG. 1) can be contained within a memory card (e.g., flash memory card), views of which are shown in FIG. 20.

Figure 2:
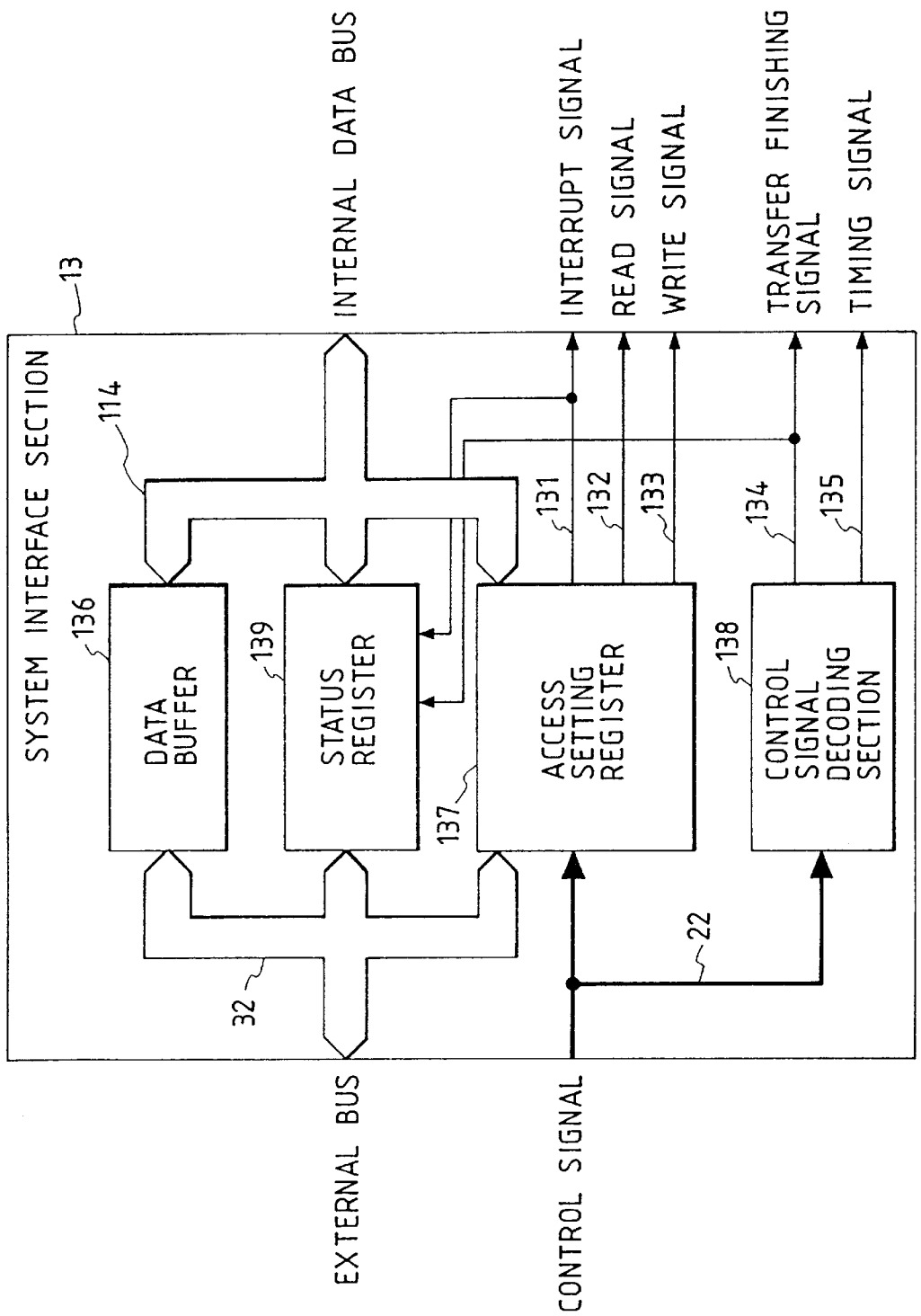
FIG. 2 is a block diagram showing a configuration of a system interface section 13.

FIG. 2 is a block diagram showing a configuration of the system interface section 13. A data buffer 136 performs buffering of sector data from the external bus 32 and sector data from the internal data bus 114. The command from the host computer 2 is set to an access setting register 137 along the line 22. The command indicates the front address of the sector data to be accessed, a type of access (read or write) and the number of sectors (e.g., range of sector numbers or addresses) to be accessed. When the host computer 2 sets the command to the access setting register 137, the access setting register 137 outputs an interrupt signal 131. Also the access setting register 137 outputs a read signal 132 or a write signal 133 responsive to the set command. A control signal decoding section 138 outputs a transfer finishing signal 134 and a timing signal 135 from a control signal 22. The transfer finishing signal 134 is outputted when the access to data of one sector is finished. The timing signal 135 is generated from the control signal 22 when the host computer 2 reads or writes the sector data. A status register 139 stores data indicating the state of the memory control unit 1. When the interrupt signal 131 is outputted and when the transfer finishing signal 134 is outputted, the status register 139 is set to the busy state. Also the status register 139 is set to the ready state by the microprocessor 8. When the status register 139 is in the busy state, the host computer does not read and write the sector data.

Figure 3:
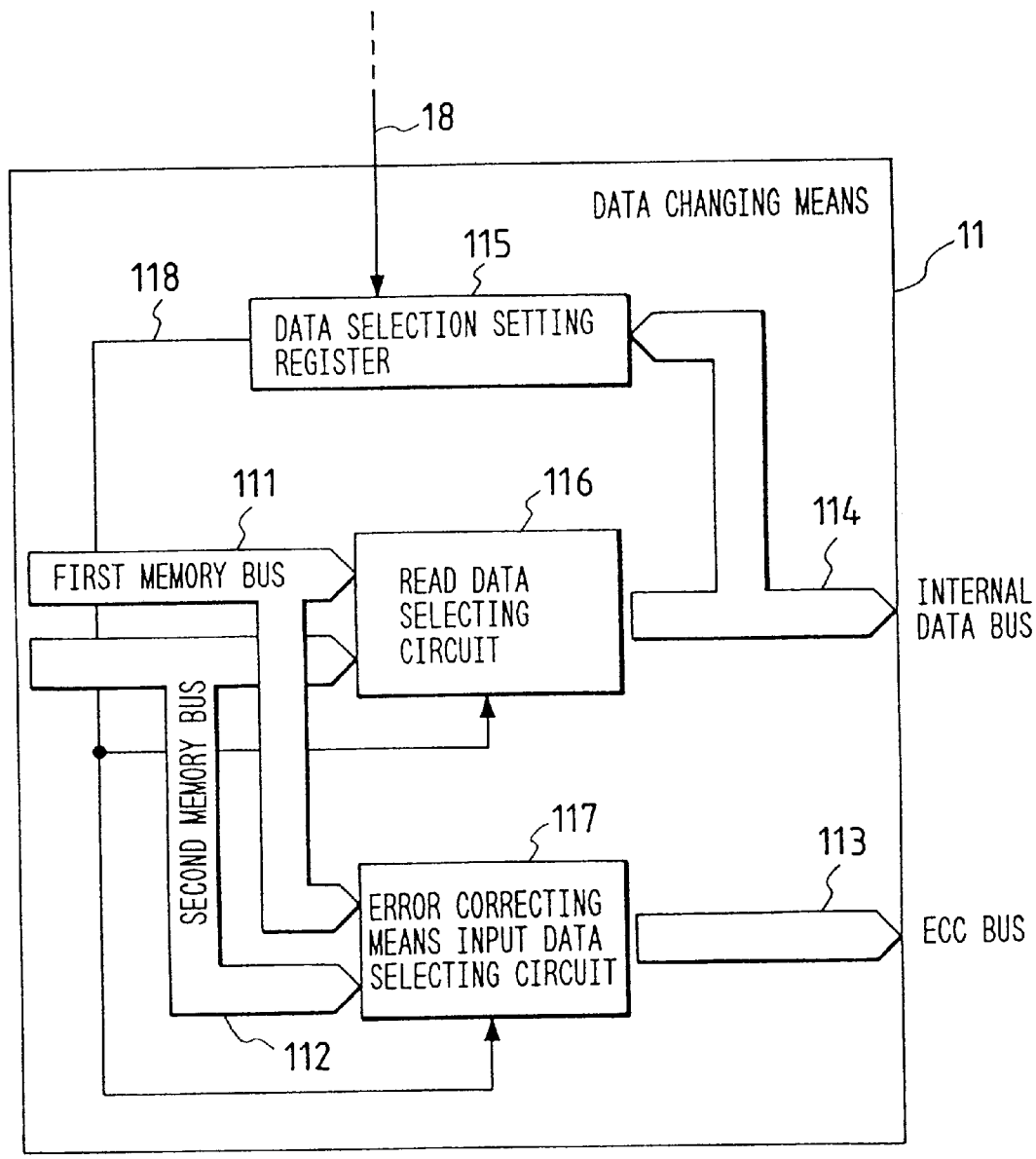
FIG. 3 is a block diagram showing a configuration of data changing means 11.

FIG. 3 is a block diagram showing configuration of the data changing means 11. A data selection setting register 115 is a storage means set by the microprocessor 8 using, for example, a signal along a signal line 18, where information to select the data to be outputted to the ECC bus 113 and the internal data bus 114 from the first memory bus 111 or the second memory bus 112 is set. A read data selecting circuit 116 selects data to be outputted to the internal data bus 114 from the first memory bus 111 or the second memory bus 112 according to a content of the data selection setting register 115. An error correcting means input data selecting circuit 117 selects data to be outputted to the ECC bus 113 from the first memory bus 111 or the second memory bus 112 according to a content of the data selection setting register 115.

FIG. 4 shows a truth table of the read data selecting circuit 116. Data to be outputted to the internal data bus 114 are selected from the first memory bus 111 or the second memory bus 112 according to a content of the data selection setting register 115. FIG. 5 shows a truth table of the error correcting means input data selecting circuit 117. Data to be outputted to the ECC bus 113 are selected from the first memory bus 111 or the second memory bus 112 according to content of the data selection setting register 115.

Figure 6:
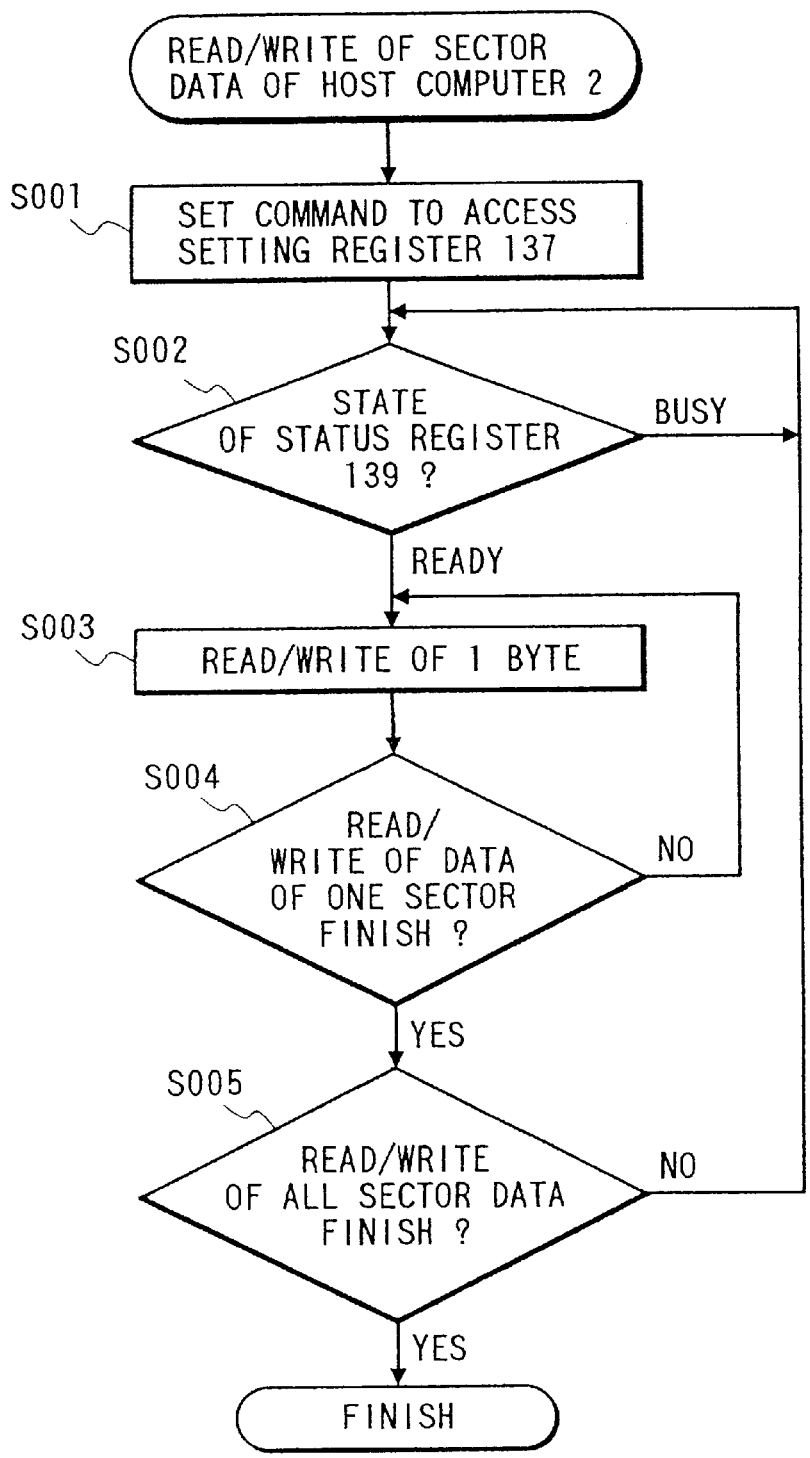
FIGS. 6–11 are flow charts showing operation of a host computer 2.
Figure 7:
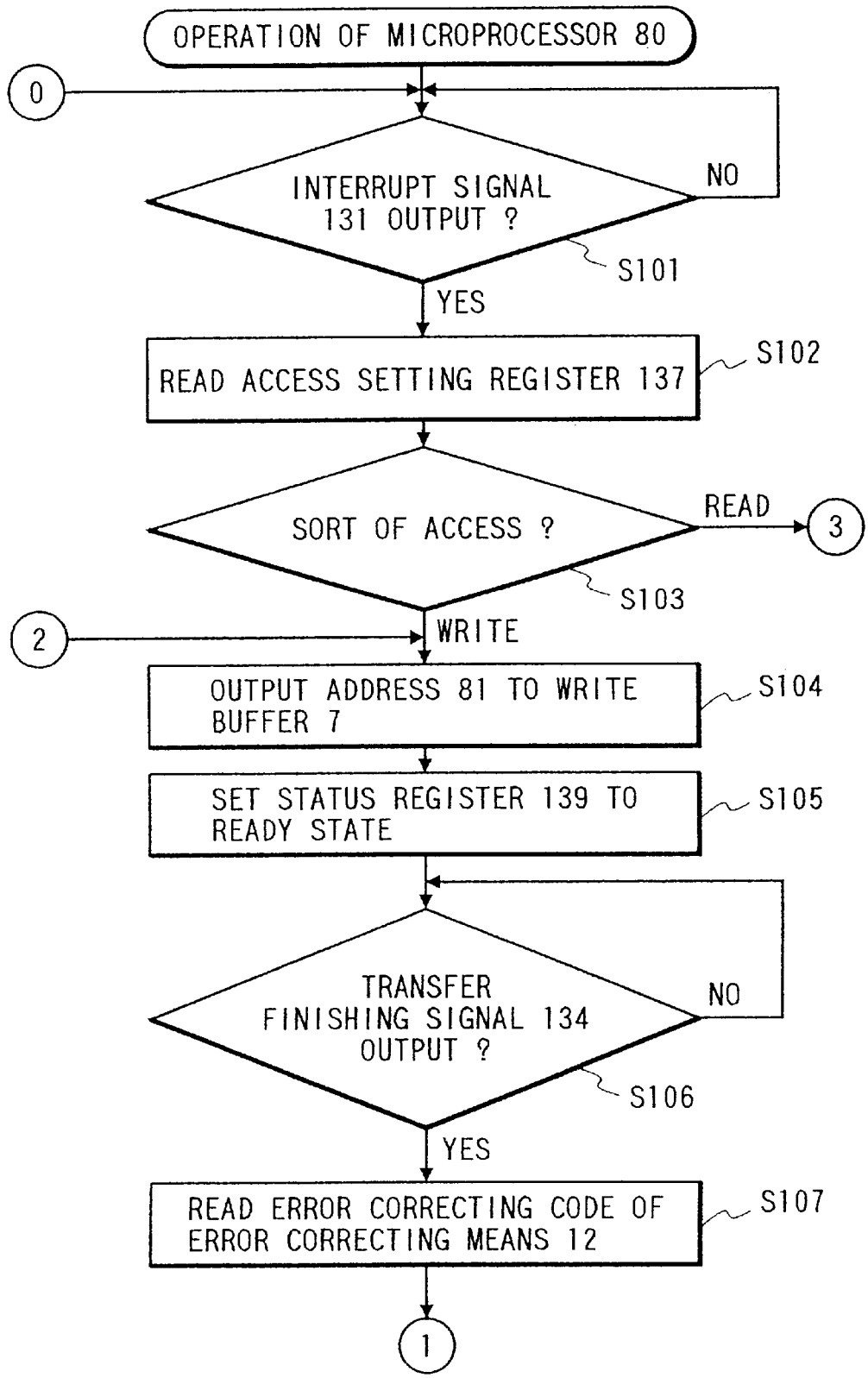

When a bus width of the system bus 3 is one byte, operation of the host computer 2 with regard to reading or writing of the sector data will be described using a flow chart as follows. More particularly, FIG. 6 is a flow chart when the host computer 2 reads or writes the sector data. First, in step S001, a command is set to the access setting register 137 within the system interface section 13. The command includes the sector number of the access start sector and the number of sectors to be accessed continuously. And then the status register 139 is supervised (step S002) by the host computer 2. If the status register 139 is set in the ready state, the host computer 2 reads or writes the data buffer 136 in the size of a one byte unit (step S003). Operation of step S003 is repeated for data of one sector until a read or write operation is finished (step S004). If a read or write operation for all sector data is not finished ("No" branch of step S005), the operations from steps S002 to S004 are repeated, and when a read or write operation for all sector data is finished, the read or write operation of the host computer 2 is finished.

Figure 8:
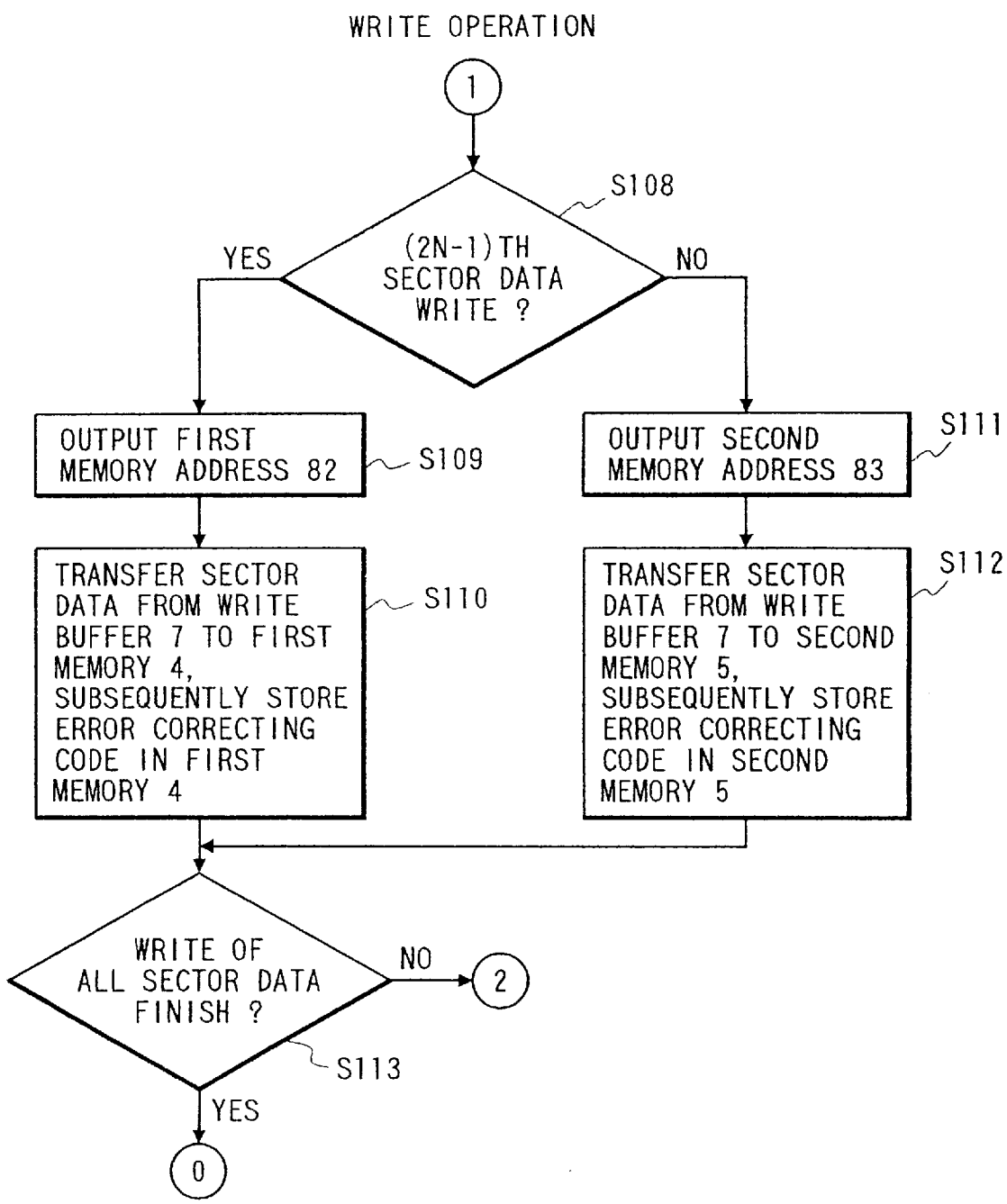
Figure 9:
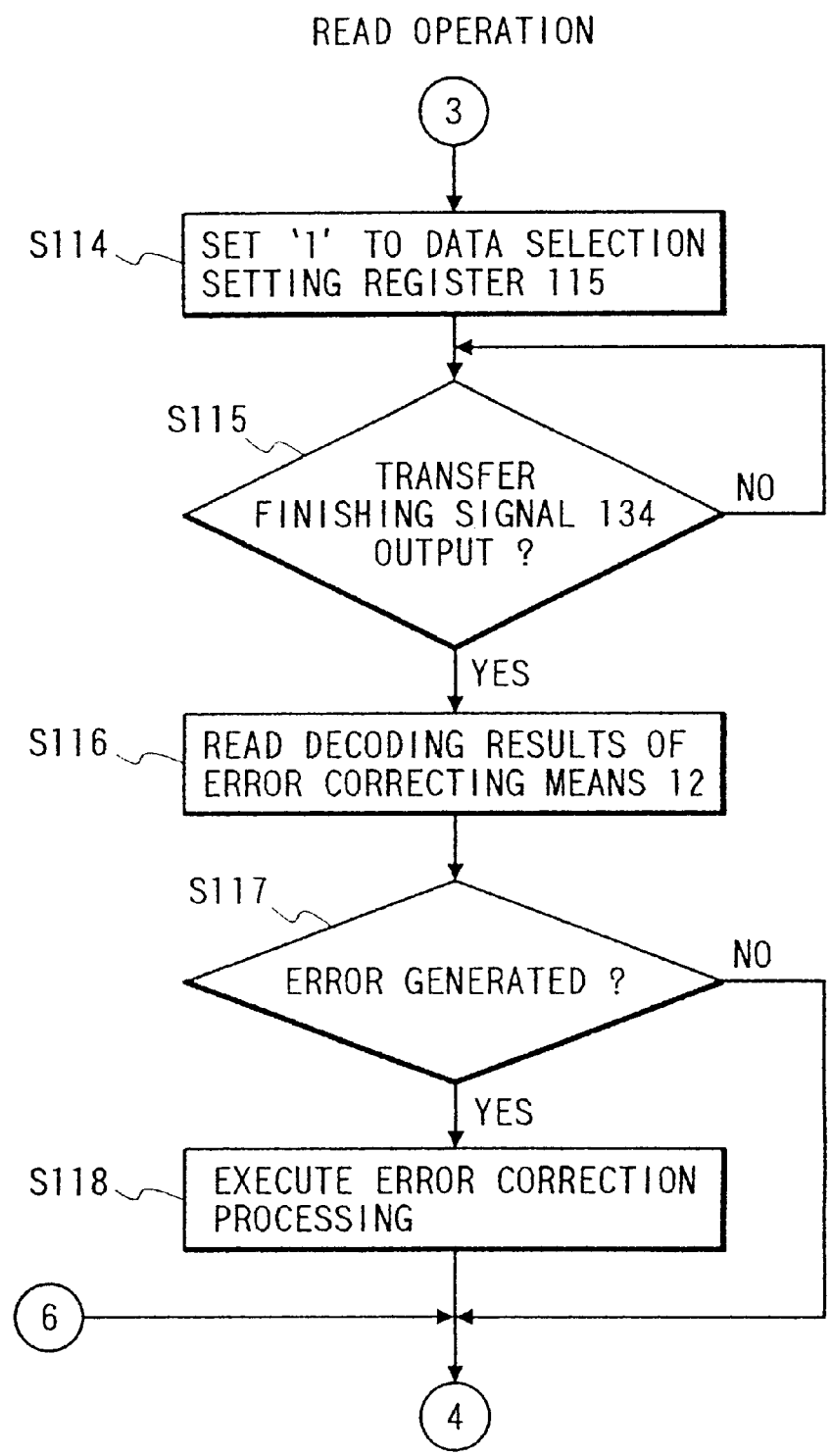

FIG. 7 to FIG. 11 are flow charts showing operation of the microprocessor 8. First, in step S101, the microprocessor 8 supervises the outputting of an interrupt signal 131 indicating that the host computer 2 has set a command to the access setting register 137. If the interrupt signal 131 is outputted, the microprocessor 8 reads out the access setting register 137 and analyzes the command set by the host computer 2 (step S102). Subsequently in step S103, if a type of access requested is a "write" operation, step S104 is executed, and if a "read" operation is requested, operation of a flow chart shown in FIG. 9 is executed.

When command of the access setting register 137 indicates a "write" operation, in order that the sector data to be written by the host computer 2 are stored in the write buffer 7, the microprocessor 8 outputs an address 81 to the write buffer 7 (step S104), and sets a ready state to the status register 139 (step S105). Subsequently, if data of one sector are stored from the host computer 2 to the write buffer 7, a transfer finishing signal 134 is outputted from the control signal decoding section 138. If the microprocessor 8 detects that the transfer finishing signal 134 is outputted in step S106, error correcting codes stored in the error correcting means 12 are read out (step S107). Subsequently, the microprocessor 8 executes operation of a flow chart shown in FIG. 8.

More particularly, turning now to FIG. 8, if the sector data stored in the write buffer 7 are the (2N−1)th (that is, odd-numbered) sector data, the first memory address 82 for the first memory 4 is outputted (step S109), and sector data are transferred from the write buffer 7 to the first memory 4 and further the error correcting codes are stored in the first memory 4 (step S110). Conversely, if the sector data stored in the write buffer 7 are the 2N-th (that is, even-numbered) sector data, the second memory address 83 for the second memory 5 is outputted (step S111), and sector data are transferred from the write buffer 7 to the second memory 5 and further the error correcting codes are stored in the second memory 5 (step S112).

Figure 17:
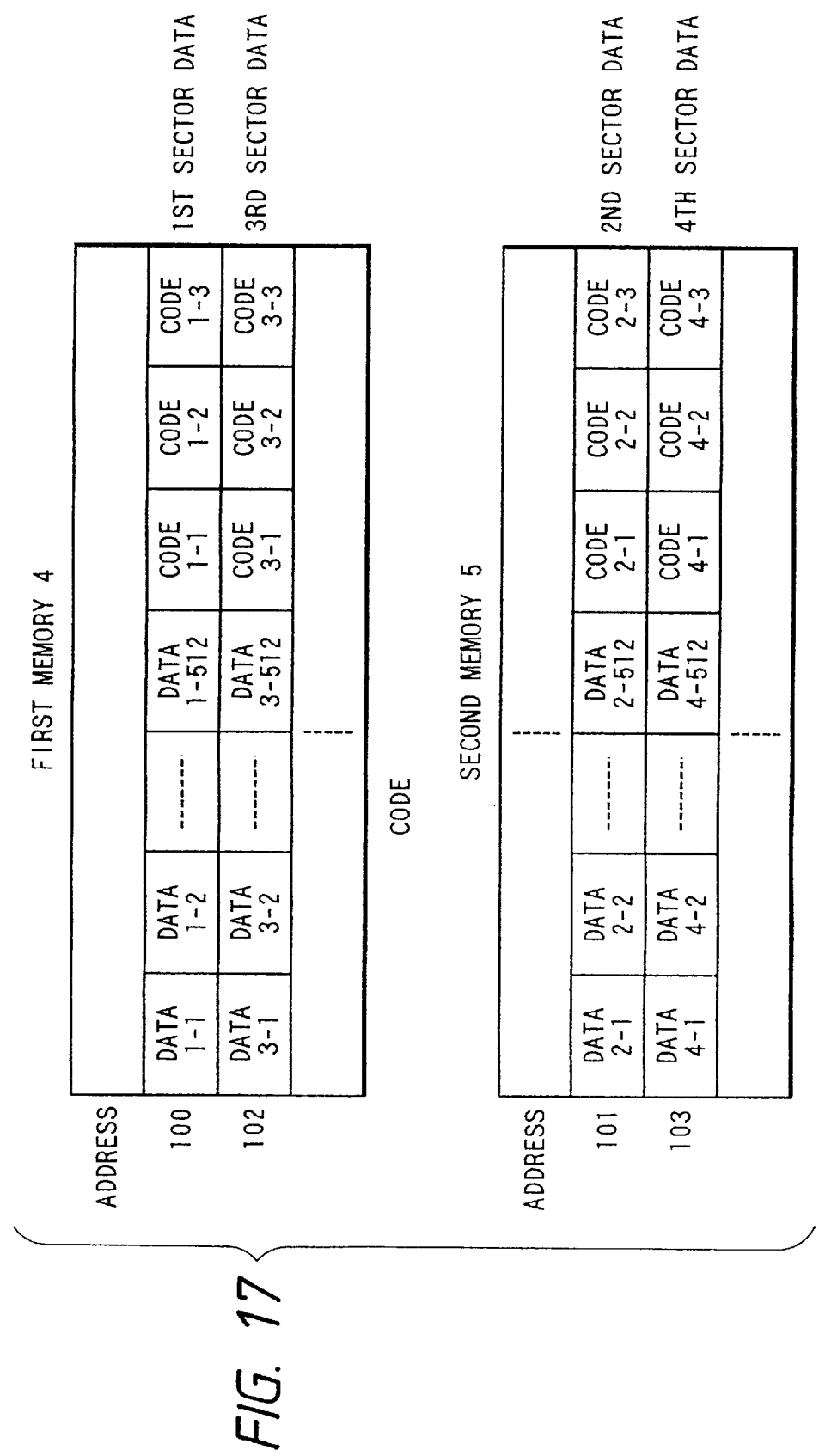
FIG. 17 is an explanation diagram of a first memory 4 and a second memory 5.

FIG. 17 shows a state of data stored in the first memory 4 and the second memory 5. As clearly seen from FIG. 17, data of one sector (here 512 bytes) and error correcting codes generated therefor are stored in each address of the first and second memories. Error correcting codes in this preferred embodiment consist of one code (here 3 bytes) given to the data of one sector.

When a writing operation of all sector data from the host computer 2 is finished, the microprocessor 8 repeats operations from step S101. When it is not finished, operations from step S104 to step S112 as above described are repeated (S113).

If the command of the access setting register 137 indicates a "read" operation, operation of a flow chart shown in FIG. 9 is executed. More particularly, turning now to FIG. 9, first, the host computer 2 performs error detection and error correction for sector data to be read first. Since (2N−1)th (i.e., odd-numbered) sector data are stored in the first memory 4, in order to input the first sector data to the error correcting means 12, the microprocessor 8 sets a '1' to the data selection setting register 115 (step S114). Thereby in the memory control unit 1, sector data read from the first memory 4 are directed within the data changing means 11 into the ECC bus 113 and are then outputted, and error detection and error correction for the sector data read from the first memory 4 are performed in the error correcting means 12. Here, from the first memory 4, the sector data and the error correcting codes subsequent thereto are outputted and the error correcting codes are inputted to the error correcting means 12. Thereby in the error correcting means 12, the sector data read from the first memory 4 are decoded and any error therein can be detected. Also in the memory control unit 1, if outputting of the sector data read from the first memory 4 are finished for the error correcting means 12, the transfer finishing signal 134 is outputted to the microprocessor 8. If the microprocessor 8 detects that the transfer finishing signal 134 is outputted (step S115), the decoding results stored in the error correcting means 12 are read out (step S116), and a decision is effected regarding whether any error is generated (i.e., detected) or not (step S117). If an error is generated, the microprocessor 8 makes the error correcting means 12 start the error correction processing thereby to determine an error position and correction pattern, and returns and writes correction results to the sector data having error generated and stored in the first memory 4 (step S118). If no error is generated, process is advanced to step S119 in FIG. 10.

Figure 10:
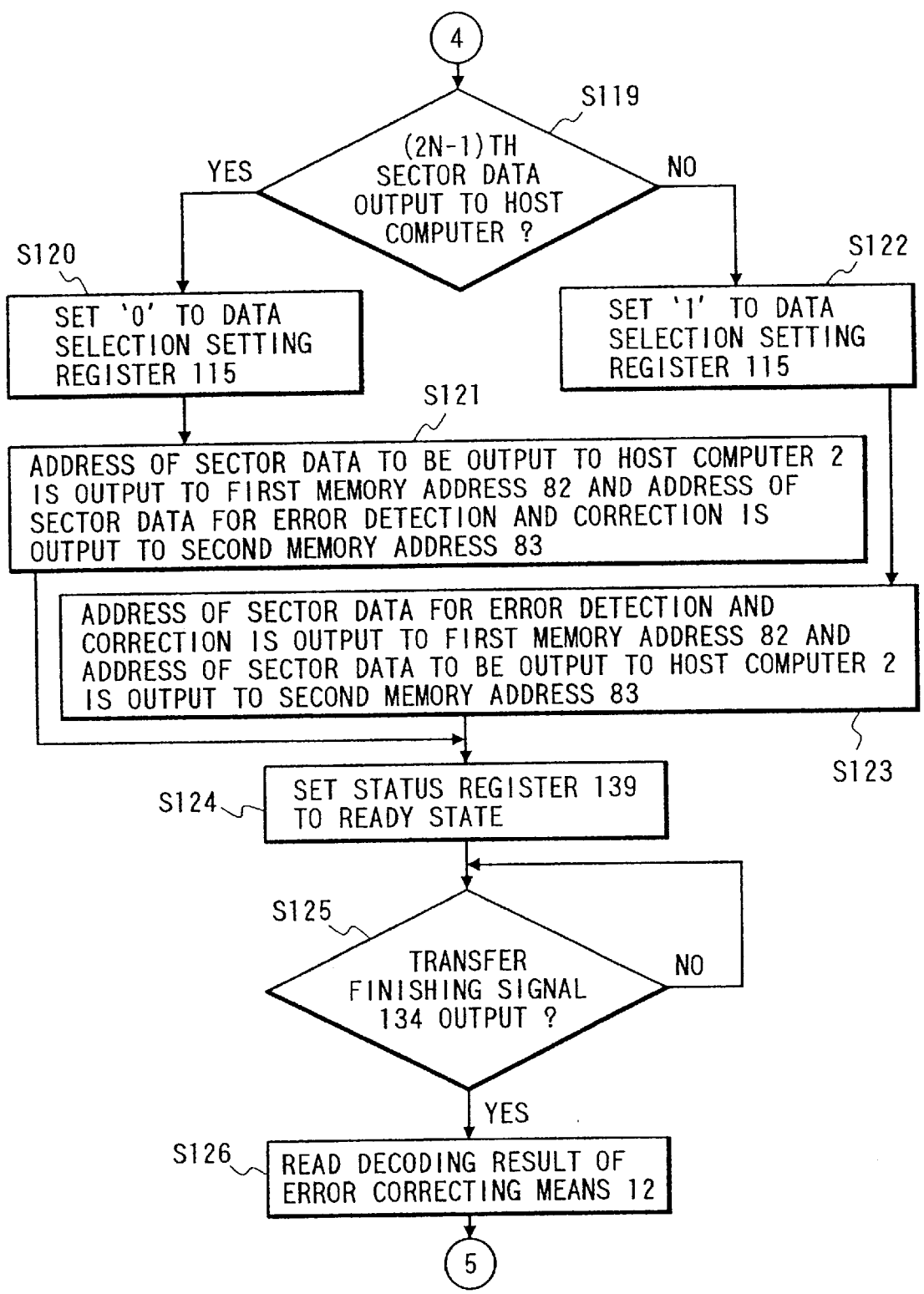

More particularly, in turning to FIG. 10, in step S119, the microprocessor 8 confirms whether the sector data to be outputted to the host computer 2 are the (2N−1)th (i.e., odd-numbered) data or not. In step S120, the microprocessor 8 sets '0' to the data selection setting register 115, so that the (2N−1)th sector data are outputted to the host computer 2 and also the 2N-th sector data are inputted to the error correcting means 12. In a next step S121, an address of sector data to be outputted to the host computer 2 is outputted to the first memory address 82, and an address of the sector data performing error detection and error correction is outputted to the second memory address 83.

In step S122, the microprocessor 8 sets '1' to the data selection setting register 115, so that the 2N-th sector data are outputted to the host computer 2 and also the (2N+1)th sector data are inputted to the error correcting means 12. In step S123, an address of the sector data performing error detection and error correction is outputted to the first memory address 82, and address of the sector data to be outputted to the host computer 2 is outputted to the second memory address 83. Then, the microprocessor 8 sets the status register 139 to the ready state (step S124).

Figure 11:
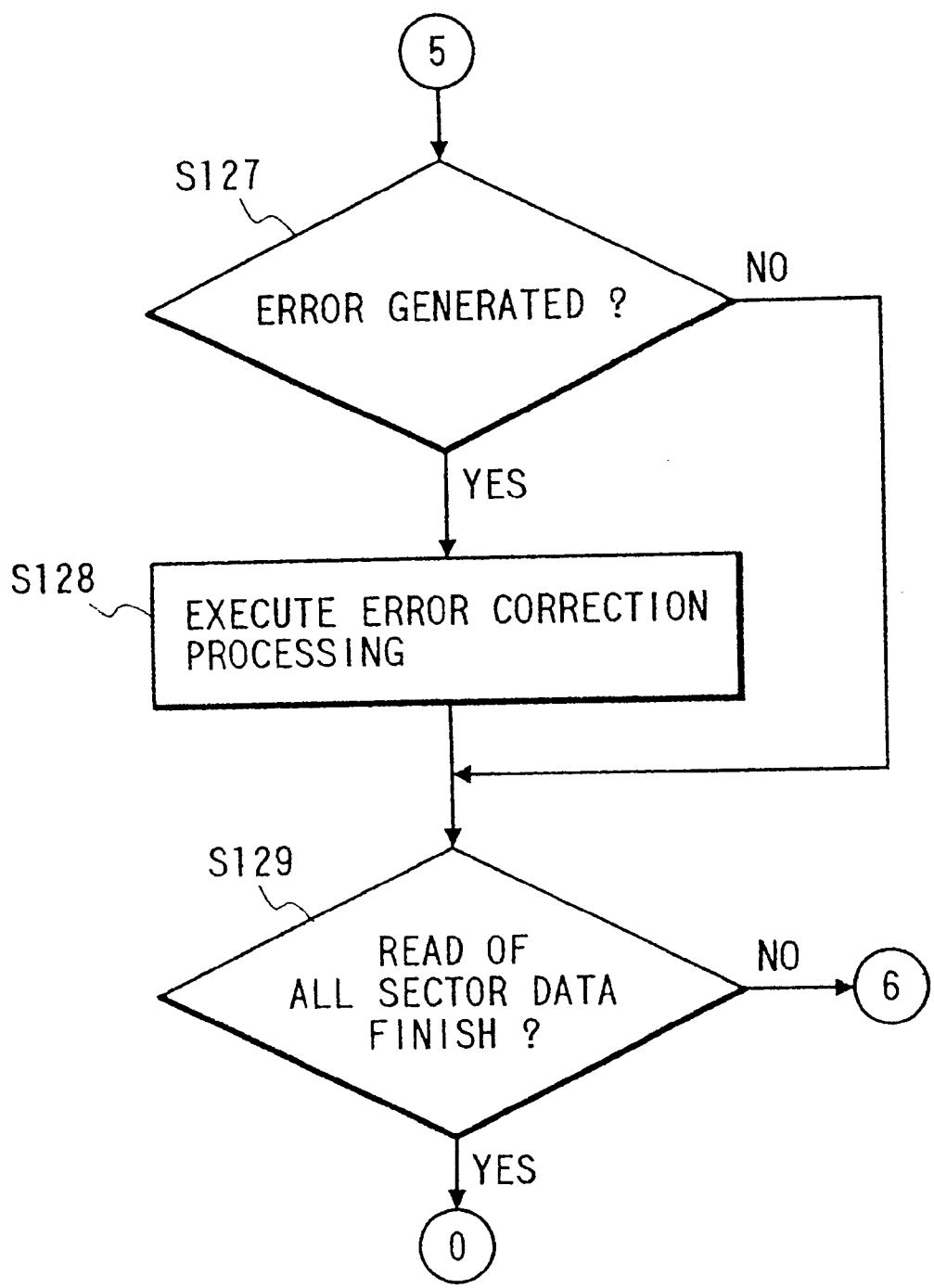

More particularly, the status register 139 is set to the ready state, thereby the host computer 2 reads the sector data for the memory control unit 1. In step S125, a decision is effected regarding whether the transfer finishing signal 134 is outputted or not. If a reading operation for data of one sector is finished, a transfer finishing signal 134 is outputted from the control signal decoding section 138 of the memory control unit 1. More particularly, the transfer finishing signal 134 is outputted, thereby the microprocessor 8 reads out the decoding results stored in the error correcting means 12 (step S126), and a decision (step S127; FIG. 11) is effected regarding whether an error is generated (i.e., detected) or not. If an error is generated, the microprocessor 8 makes the error correcting means 12 start an error correction processing to thereby determine an error position and correction pattern, and the correction results are returned and written to the sector data in the first memory 4 or the second memory 5 (step S128) having such error therein. If no error is generated, the process is advanced to step S129. When the host computer 2 finishes reading of all sector data, the microprocessor 8 repeats operations from step S101, and when it is not finished, operations are repeated from steps S119 to S128 as above described (step S129).

Figure 16:
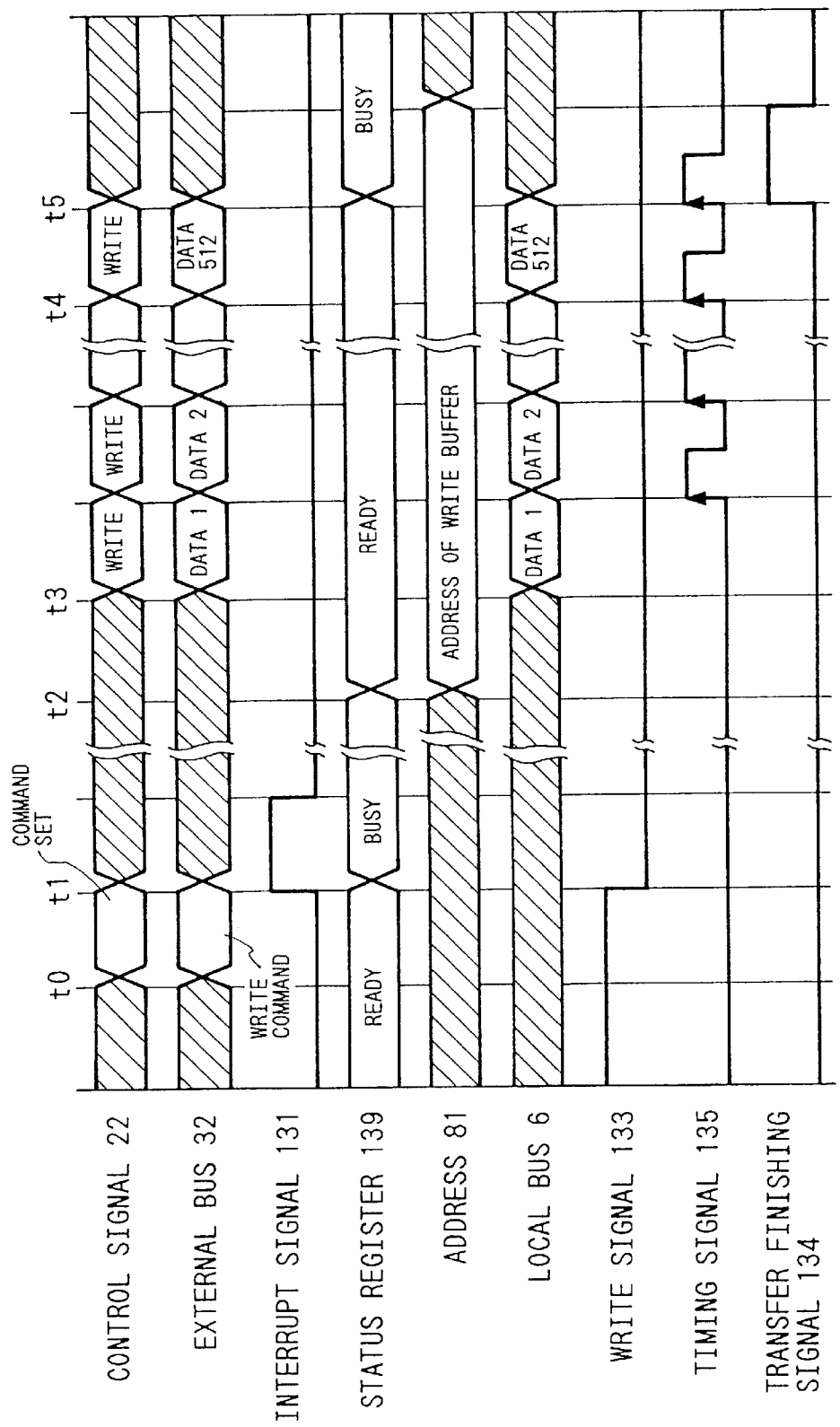
FIG. 16 is a timing chart showing an operation example of a write processing in an embodiment of the present invention.

Next, a specific processing example of the device of FIG. 1 will be described using the timing charts shown in FIG. 16, FIG. 18 and FIG. 19. More particularly, FIG. 16 shows a write operation writing a sector data from the host computer 2 to the memories 4, 5. At the time "t0", if a write command is set from the host computer 2 to the access setting register 137, at the time "t1", an interrupt signal 131 is generated and such interrupt is applied to the microprocessor 8. Also at the time "t1", the status register 139 is changed to indicate a busy signal. Then, at the time "t2", the status register 139 is changed to indicate a ready signal and the microprocessor 8 generates an address 81 to the write buffer 7. At the time "t3" or later, data 1 to 512 representing 512 bytes are written in sequence one byte at a time into the assigned address positions of the write buffer 7 according to the timing signal 135. Also the data 1 to 512 representing 512 bytes are inputted from the internal data bus 114 to the error correcting means 12 according to the timing signal 135, and the error correcting means 12 generates error correcting codes. If the final data of 512 bytes are written at the time "t4", a transfer finishing signal 134 is outputted at the time "t5". Then, the sector data stored in the write buffer 7 in such manner are written in the first memory 4 or the second memory 5 as described in FIG. 8. The storage results stored within the memories 4, 5 become as shown in FIG. 17.

Figure 18:
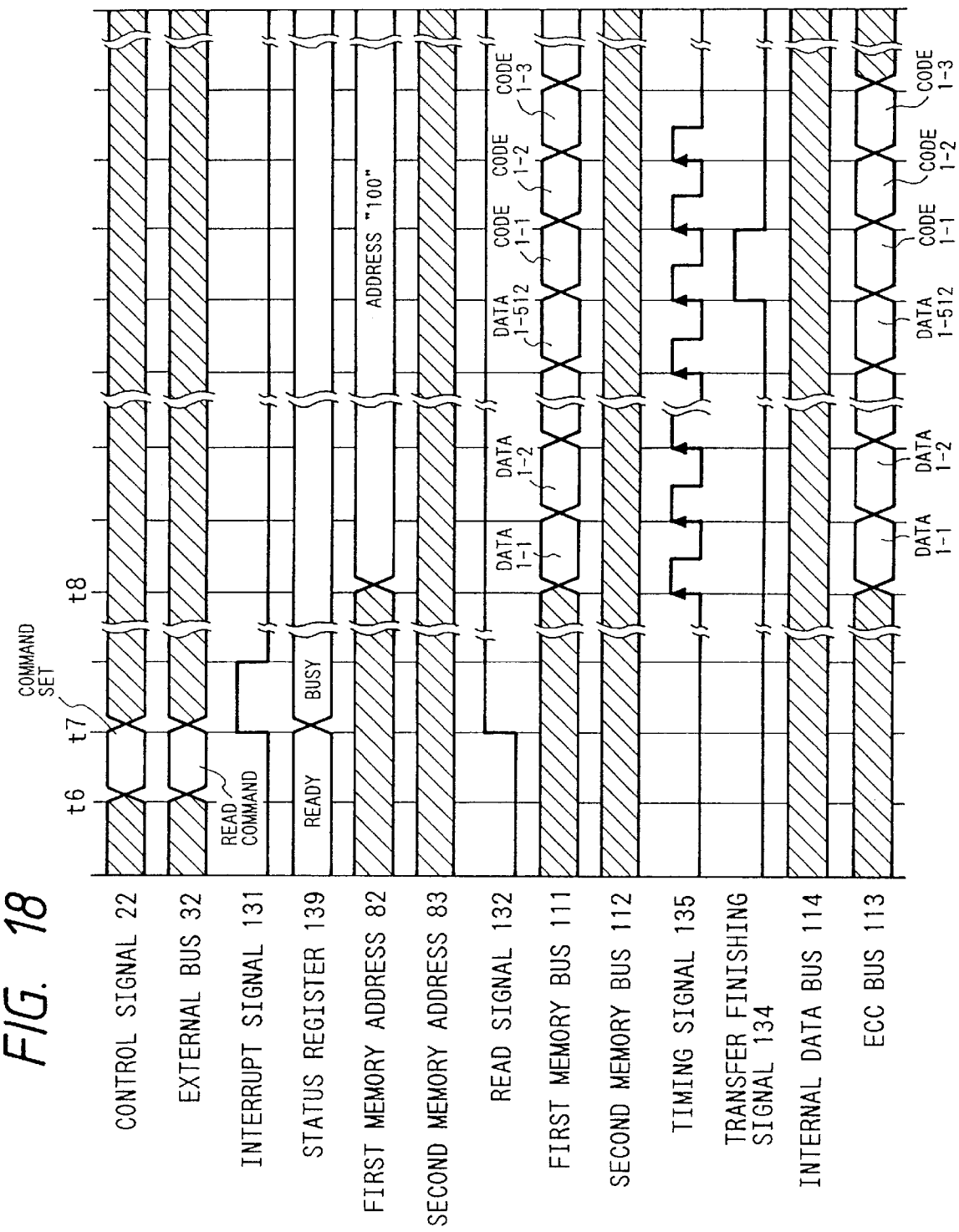
FIG. 18 is a timing chart showing an operation example of a read processing in an embodiment of the present invention.
Figure 19:
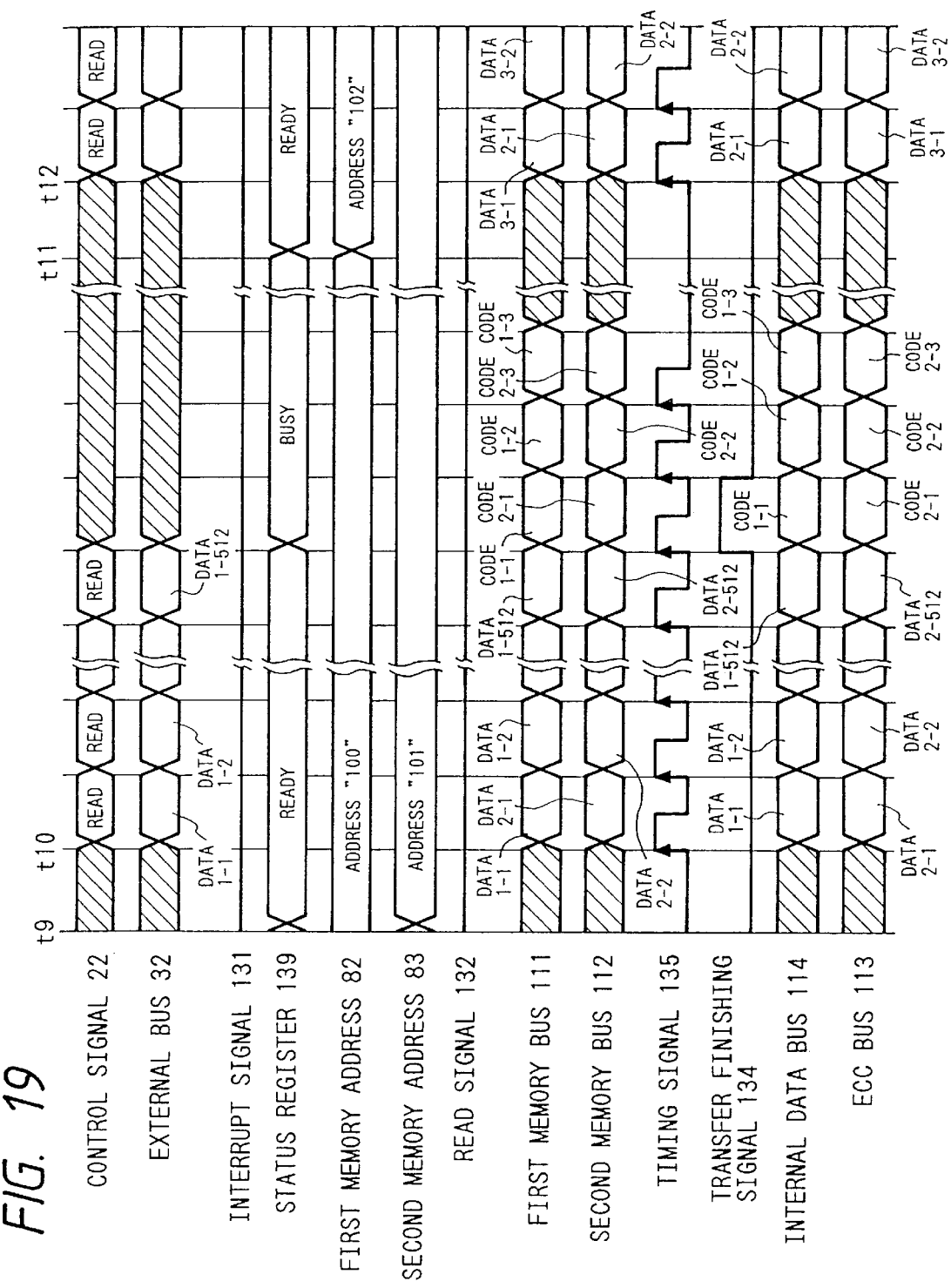
FIG. 19 is a timing chart subsequent to the timing chart in FIG. 18.

FIG. 18 and FIG. 19 show a read operation reading the sector data of the memories 4, 5 as requested from the host computer 2. First in FIG. 18, at the time "t6", a read command is set from the host computer 2 to the access setting register 137, and then at the next time "t7", an interrupt signal 131 is generated and the interrupt is applied to the microprocessor 8. In this example, data of plural sectors at the address "100" or later shall be read out continuously. At a time "t8", the address "100" of the first sector to be read out is given to the first memory address 82, and at a time "t8" or later, the data of 512 bytes and the accompanying error correcting codes of 3 bytes are read out from the first memory bus 111 in sequence one byte at a time according to the timing signal 135. These data are outputted to the ECC bus 113 and then inputted to the error correcting means 12.

Next, referring to FIG. 19, in order that the data of the first sector with the error check finished are outputted in turn to the internal data bus 114 (that is, to the side of the host computer 2), a directing state of the data changing means 11 is reversed. At a time "t9", the address of the first memory address 82 remains "100" and the address of the second memory address 83 is made "101." At a time "t10" or later, the sector data of the address "100" are read out again from the first memory 4. The sector data are outputted to the internal data bus 114. Simultaneous with outputting of the "100" address sector data, the data of 512 bytes of the second sector and the accompanying error correcting codes of 3 bytes are read out in sequence one byte at a time from the address "101" of the second memory 5, and are then outputted to the ECC bus 113 communicating with the error correcting means 12. After the reading of both sector data are finished, at the time "t1", in turn, the address "101" of the second memory 5 having an error check finished is outputted to the memory address 82 of the first memory 4 and the second memory address 5 remains at the address "101." The directing state of the data changing means 11 is then reversed. Thereby at the time "t12" or later, the sector data of the address "101" are outputted to the internal data bus 114, and at the same time the sector data of the address "102" corresponding to a next sector are outputted to the side of the ECC bus 113. Thus during reading of data of continuous sectors, the sector data are obtained continuously on the internal data bus 114. As a result, it appears to the host computer 2 as if the time for error check processing by the error correcting means 12 did not exist.

As above described, according to this embodiment, the microprocessor 8 stores odd-numbered sector data stored in the write buffer 7 to the first memory 4 and also stores even-numbered sector data to the second memory 5. Accordingly, since the host computer 2 can read the N-th sector data and simultaneously can output the (N+1)th sector data to the error correcting means 12, the time required for error detection and error correction to the (N+1)th sector data can be reduced apparently (i.e., made transparent to the host computer).

Figure 12:
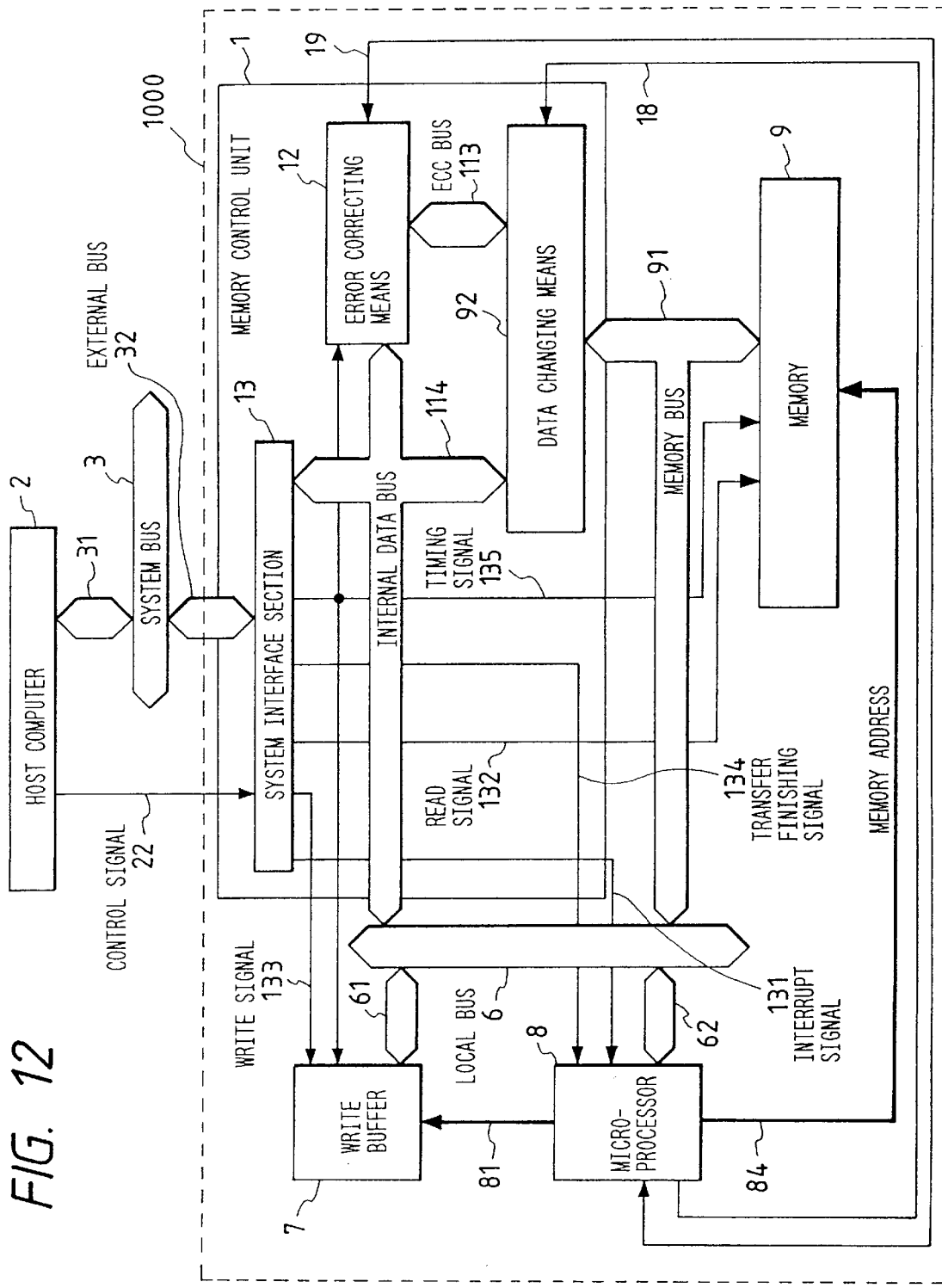
FIG. 12 is a block diagram showing a system configuration of another embodiment of an external storage device of the invention.

FIG. 12 is a block diagram showing a system configuration of another embodiment of an external storage device according to the present invention. More particularly, except for a memory 9, a memory bus 91 and data changing means 92, this embodiment has the same configuration as that of FIG. 1 and performs a same operation. A memory 9 has a bus width which is twice as large as that possessed by each of the first memory 4 and the second memory 5 in FIG. 1, and is connected by a memory bus 91 to data changing means 92 of a memory control unit 1 and a local bus 6. The data changing means 92 selectively directs upper data and lower data from the memory bus 91 into an internal data bus 114 and an ECC bus 113.

Figure 13:
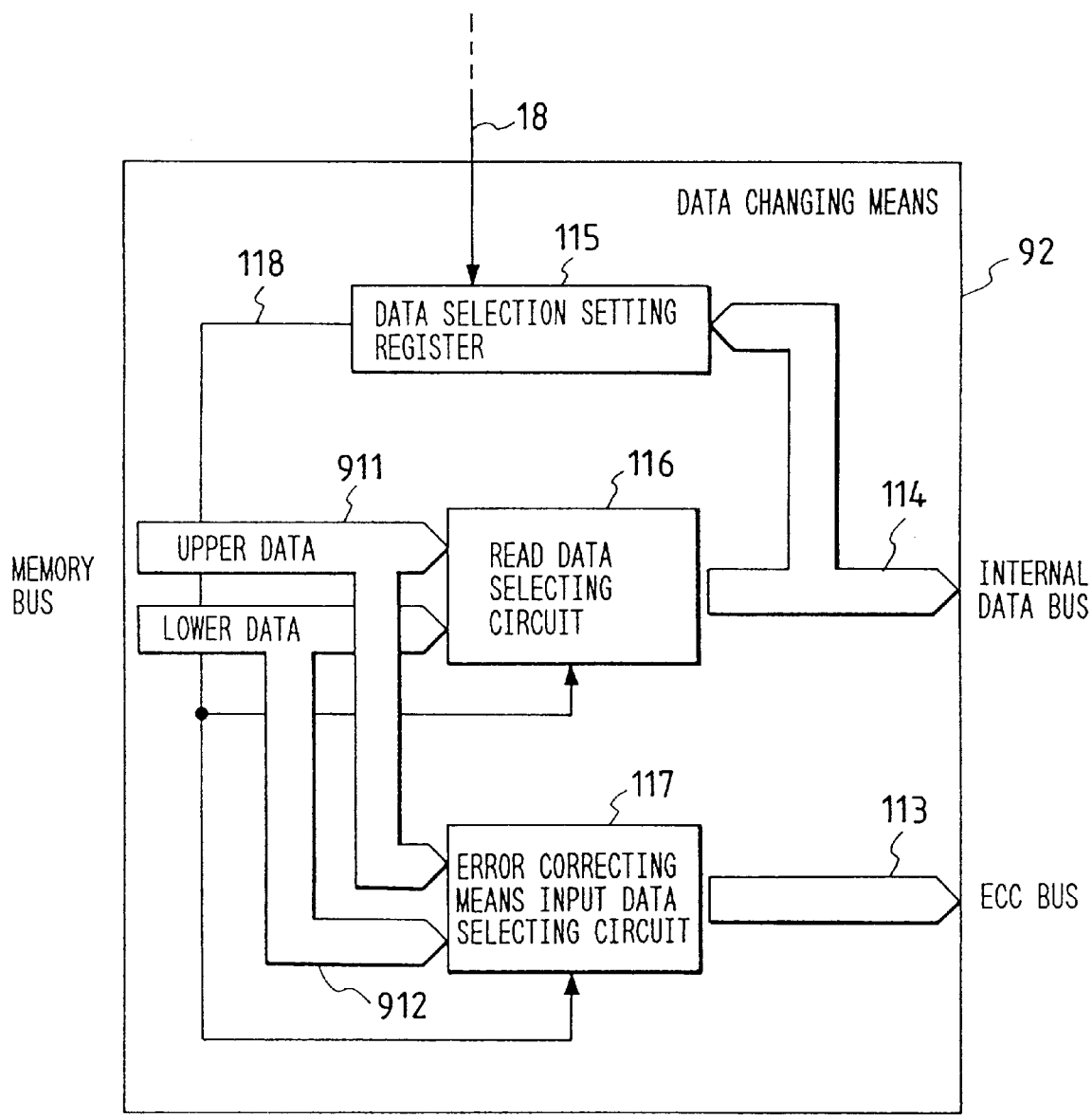
FIG. 13 is a block diagram showing a configuration of data changing means.

FIG. 13 is a block diagram showing a configuration of the data changing means 92. A data selection setting register 115, a read data selecting circuit 116 and an error correcting means input data selecting circuit 117 perform the same operation as that shown and described with respect to the block diagram of FIG. 3. Data from the memory bus 91 are inputted as upper data 911 and lower data 912 to a read data selecting register 116 and an error correcting means input data selecting circuit 117. The read data selecting register 116 outputs the upper data 911 or the lower data 912 to the internal data bus 114 according to a content of the data selection setting register 115. Also the error correcting means input data selecting circuit 117 outputs the upper data 911 or the lower data 912 to the ECC bus 113 also according to a content of the data selection setting register 115.

That is, also for the memory 9 having the bus width twice as large as that of the system bus 3, since the microprocessor 8 stores the (2N−1)th (odd-numbered) sector data stored in the write buffer 7 to upper bit memory positions and stores the 2N-th (even-numbered) sector data to lower bit memory positions on the same memory bus, the host computer 2 can simultaneously output the N-th sector data to the internal data bus 114 and can output the (N+1)th sector data to the error correcting means 12. Consequently, a time required for the error detection and the error correction to the (N+1)th sector data can be reduced apparently (i.e., made transparent to a host computer 2).

Figure 14:
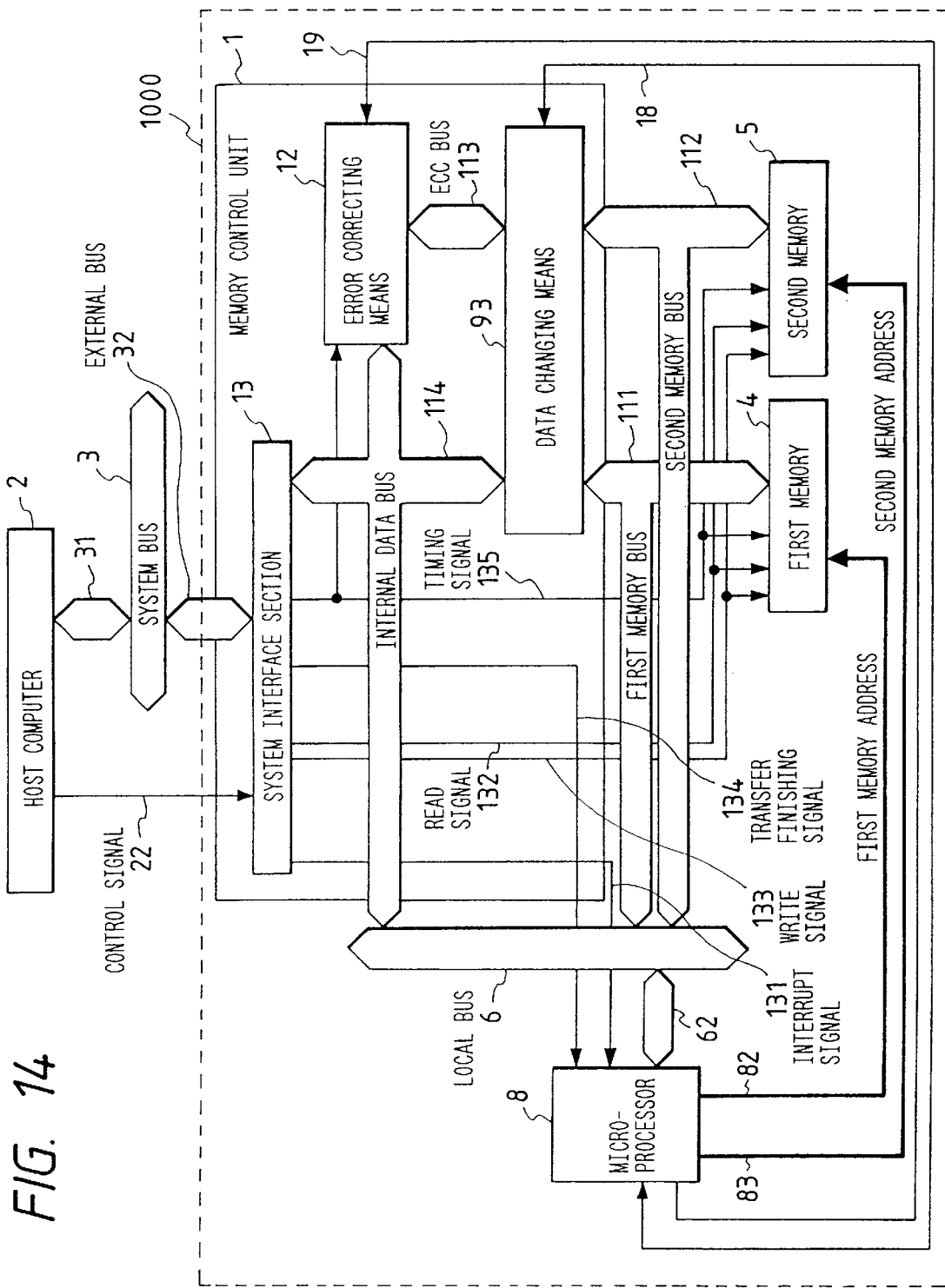
FIG. 14 is a block diagram showing a system configuration of still another embodiment of an external storage device of the invention.

FIG. 14 is a block diagram showing a system configuration of another embodiment of an external storage device according to the present invention. In the configuration of FIG. 14, the write buffer 7 shown in the block diagram of FIG. 1 is not used. That is, the sector data written by a host computer 2 are not stored temporarily to the write buffer, but are written directly to a first memory 4 or a second memory 5. Therefore when the host computer 2 writes the sector data, data changing means 93 outputs data by directing the same from an internal data bus 114 to a first memory bus 111 or a second memory bus 112.

Figure 15:
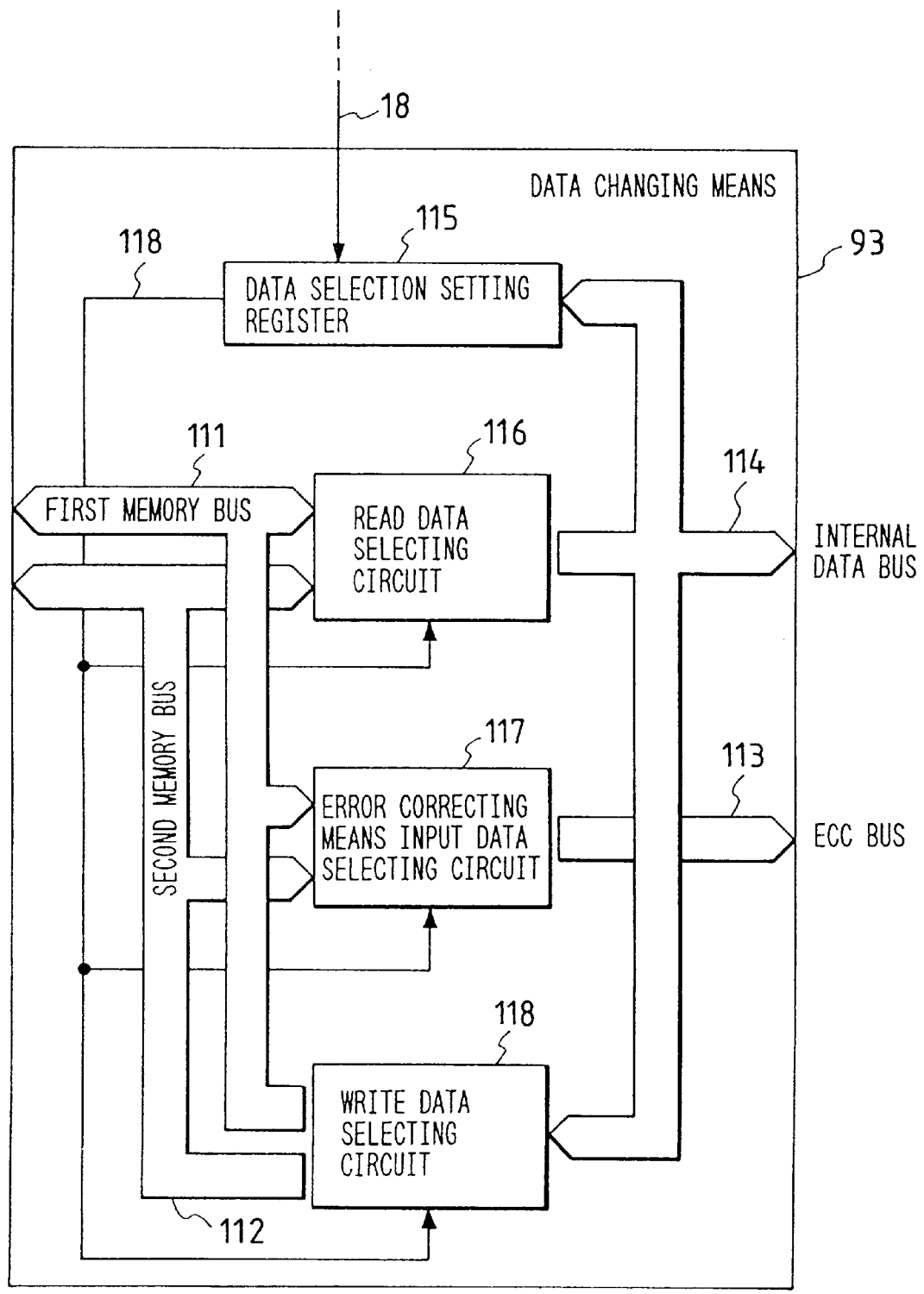
FIG. 15 is a block diagram showing a configuration of data changing means 93.

More particularly, FIG. 15 is a block diagram showing a configuration of the data changing means 93. A data selection setting register 115, a read data selecting circuit 116 and an error correcting means input data selecting circuit 117 perform the same operation as that shown and described with respect to the block diagram of FIG. 3. A write data selecting circuit 118 outputs data of an internal data bus 114 by directing the same to a first memory bus 111 or a second memory bus 112 according to a content of the data selection setting register 115. When the data selection setting register 115 is '0', the sector data of the internal data bus 114 are outputted to the first memory bus 111, and when the data selection setting register 115 is '1', the sector data of the internal data bus 114 are outputted to the second memory bus 112.

That is, since the write data selecting circuit 118 of the data changing means 11 outputs the (2N−1)th (odd-numbered) sector data to the first memory bus 111 and outputs the 2N-th (even-numbered) sector data to the second memory bus 112, the (2N−1)th sector data can be stored in the first memory 4 and the 2N-th sector data can be stored in the second memory 5. Thereby since the host computer 2 can read the N-th sector data and simultaneously can output the (N+1)th sector data to the error correcting means 12, the time required for the error detection and the error correction to the (N+1)th sector data can be reduced apparently (i.e., made invisible to the host computer 2).

This concludes the description of the preferred embodiments.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject data changing means arrangement within the scope of the foregoing disclosure, the drawings and the appended claims without departing from the spirit of the invention, e.g., the following represents a non-exhaustive list of modifications which might readily be apparent to one skilled in the art to which the present invention is directed: data obtained from the first memory or second memory may be temporarily stored in buffer memories before outputting to the internal data bus or error correcting means; and, the data within the error correcting means which has been subjected to error detection and correction may be outputted onto the internal data bus rather than performing a redundant reading from the memory.

In addition to variations and modifications in the component parts and/or arrangements, uses with alternative non-static memories or with internal memories will also be apparent to those skilled in the art. More particularly, while the above disclosure has discussed applications of the subject combination arrangement with respect to static memories, it will be apparent to those skilled in the art that each of the subject combination arrangements are not so limited to such usage, but instead, could find application in a tremendous number of other uses, e.g., the combination arrangement disclosed above might have application with respect to dynamic memories.

What is claimed and desired to be secured by Letters Patent of the United States is:

1. A storage device comprising:
    a system interface unit which carries out interface with a host system via an external bus;
    a controller coupled with said system interface which analyzes commands received by said system interface unit from said host system and controls operations to be performed within said storage device; a non volatile semiconductor memory coupled with said controller; and
    an error correction unit, coupled with said non-volatile semiconductor memory, which performs an error detection and error correction operation for data stored in said non-volatile semiconductor memory;
    wherein said non-volatile semiconductor memory is electrically erasable and electrically programmable and stores data from said host system via said system interface unit,
    wherein in response to a read command received by said system interface unit, said controller carries out concurrent operations of data transferring of data after the error detection and error correction operation by said error correction unit to said host system via said system interface unit and of data transferring of subsequent data for the error detection and error correction operation from said non-volatile semiconductor memory to said error correction unit.

2. A storage device as claimed in claim 1,
    wherein said concurrent operations of said data transferring of data after the error detection and error correction operation by said error correction unit to said host system via said system interface unit and of data transferring of subsequent data for the error detection and error correction operation from said non-volatile semiconductor memory to said error correction unit are carried out by two memories and by said controller.

3. A storage device as claimed in claim 2,
    wherein in response to said read command received by said system interface unit, one of said two memories originates said data after the error detection and error correction operation and another of said two memories originates said subsequent data for the error detection and error correction operation.

4. A storage device as claimed in claim 3, wherein said one and said other of said two memories are said non-volatile semiconductor memory.

5. A storage device as claimed in claim 4, wherein said non-volatile semiconductor memory is a flash memory.

6. A storage device as claimed in claim 5,
    wherein said one of said two memories is coupled with said error correction unit via a first memory bus, said other of said two memories is coupled with said error correction unit via a second memory bus,
    wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and
    wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

7. A storage device as claimed in claim 4,
    wherein said one of said two memories is coupled with said error correction unit via a first memory bus, said other of said two memories is coupled with said error correction unit via a second memory bus,
    wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

8. A storage device as claimed in claim 2, wherein said one and said other of said two memories are said non-volatile semiconductor memory.

9. A storage device as claimed in claim 8, wherein said non-volatile semiconductor memory is a flash memory.

10. A storage device as claimed in claim 9,
wherein said one of said two memories is coupled with said error correction unit via a first memory bus, said other of said two memories is coupled with said error correction unit via a second memory bus,
wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and
wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

11. A storage device as claimed in claim 8,
wherein said one of said two memories is coupled with said error correction unit via a first memory bus, said other of said two memories is coupled with said error correction unit via a second memory bus,
wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and
wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

12. A storage device comprising:
a system interface unit which carries out interface with a host system via an external bus;
a controller coupled with said system interface which analyzes commands received by said system interface unit from said host system and controls operations to be performed within said storage device;
a non-volatile semiconductor memory coupled with said controller; and
an error correction unit, coupled with said non-volatile semiconductor memory, which performs an error detection and error correction operation for data stored in said non-volatile semiconductor memory;
wherein said non-volatile semiconductor memory is electrically erasable and electrically programmable and stores data from said host system via said system interface unit,
wherein in response to a read command received by said system interface unit, said controller carries out parallel operations of data transferring of data after the error detection and error correction operation by said error correction unit to said host system via said system interface unit and of data transferring of subsequent data for the error detection and error correction operation from said non-volatile semiconductor memory to said error correction unit.

13. A storage device as claimed in claim 12,
wherein said parallel operations of said data transferring of data after the error detection and error correction operation by said error correction unit to said host system via said system interface unit and of data transferring of subsequent data for the error detection and error correction operation from said non-volatile semiconductor memory to said error correction unit are carried out by two memories and by said controller.

14. A storage device as claimed in claim 13,
wherein in response to said read command received by said system interface unit, one of said two memories originates said data after the error detection and error correction operation and another of said two memories originates said subsequent data for the error detection and error correction operation.

15. A storage device as claimed in claim 14, wherein said one and said other of said two memories are said non-volatile semiconductor memory.

16. A storage device as claimed in claim 15, wherein said non-volatile semiconductor memory in a flash memory.

17. A storage device as claimed in claim 16,
wherein said one of said two memories is coupled with said error correction unit via a first memory bus, said other of said two memories is coupled with said error correction unit via a second memory bus,
wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and
wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

18. A storage device as claimed in claim 15,
wherein said one of said two memories is coupled with said error correction unit via a first memory bus, said other of said two memories is coupled with said error correction unit via a second memory bus,
wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

19. A storage device as claimed in claim 13, wherein said one and said other of said two memories are said non-volatile semiconductor memory.

20. A storage device as claimed in claim 19, wherein said non-volatile semiconductor memory is a flash memory.

21. A storage device as claimed in claim 20,
wherein said one of said two memories is coupled with said error correction unit via a first memory bus, said other of said two memories is coupled with said error correction unit via a second memory bus, wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

22. A storage device as claimed in claim 19,
wherein said one of said two memories is coupled with said error correction unit via a first memory bus, said other of said two memories is coupled with said error correction unit via a second memory bus, wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

23. A storage device comprising:
a system interface unit which carries out interface with a host system via an external bus;
a controller coupled with said system interface which analyzes commands received by said system interface unit from said host system and controls operations to be performed within said storage device;
a non-volatile semiconductor memory coupled with said controller; and
an error correction unit, coupled with said non-volatile semiconductor memory, which performs an error detection and error correction operation for data stored in said non-volatile semiconductor memory;

wherein said non-volatile semiconductor memory is electrically erasable and electrically programmable and stores data from said host system via said system interface unit, wherein in response to a read command received by said system interface unit, said controller carries out overlap operations of data transferring of data after the error detection and error correction operation by said error correction unit to said host system via said system interface unit and of data transferring of subsequent data for the error detection and error correction operation from said non-volatile semiconductor memory to said error correction unit.

24. A storage device as claimed in claim 23,
wherein said overlap operations of said data transferring of data after the error detection and error correction operation by said error correction unit to said host system via said system interface unit and of data transferring of subsequent data for the error detection and error correction operation from said non-volatile semiconductor memory to said error correction unit are carried out by two memories and by said controller.

25. A storage device as claimed in claim 24,
wherein in response to said read command received by said system interface unit, one of said two memories originates said data after the error detection and error correction operation and another of said two memories originates said subsequent data for the error detection and error correction operation.

26. A storage device as claimed in claim 25, wherein said one and said other of said two memories are said non-volatile semiconductor memory.

27. A storage device as claimed in claim 26, wherein said non-volatile semiconductor memory is a flash memory.

28. A storage device as claimed in claim 27,
wherein said one of said two memories is coupled with said error correction unit via a first memory bus, said other of said two memories is coupled with said error correction unit via a second memory bus, wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

29. A storage device as claimed in claim 26,
wherein said one of said two memories is coupled with said error correction unit via a first memory bus, said other of said two memories is coupled with said error correction unit via a second memory bus, wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

30. A storage device as claimed in claim 24, wherein said one and said other of said two memories are said non-volatile semiconductor memory.

31. A storage device as claimed in claim 30, wherein said non-volatile semiconductor memory is a flash memory.

32. A storage device as claimed in claim 31, wherein said one of said two memories is coupled with said error correction unit via a first memory bus, said other of said two memories is coupled with said error correction unit via a second memory bus, wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

33. A storage device as claimed in claim 30, wherein said one of said two memories is coupled with said error correction unit via a first memory bus, said other of said two memories is coupled with said error correction unit via a second memory bus, wherein during said data transfer of said data after said error detection and error correction operation, said data after said error detection and error correction operation is transferred to said host system via said system interface and said subsequent data for said error detection and error correction operation is transferred from said other of said two memories to said error correction unit via said second memory bus, and wherein during said data transfer of said subsequent data after said error detection and error correction operation, said subsequent data after said error detection and error correction operation is transferred to said host system via said system interface and further subsequent data for the error detection and error correction operation is transferred from said one of said two memories to said error correction unit via said first memory bus.

* * * * *

UNITED STATES PATENT AND TRADEMARK OFFICE
CERTIFICATE OF CORRECTION

| | | |
|---|---|---|
| PATENT NO. | : 6,701,471 B2 | Page 1 of 1 |
| APPLICATION NO. | : 09/750707 | |
| DATED | : March 2, 2004 | |
| INVENTOR(S) | : T. Tamura et al. | |

It is certified that error appears in the above-identified patent and that said Letters Patent is hereby corrected as shown below:

On the title page should read

(30) Foreign Application Priority Data

July 14, 1995    (JP)           7-179075

Signed and Sealed this

Twelfth Day of August, 2008

JON W. DUDAS
*Director of the United States Patent and Trademark Office*